Patented Feb. 19, 1952

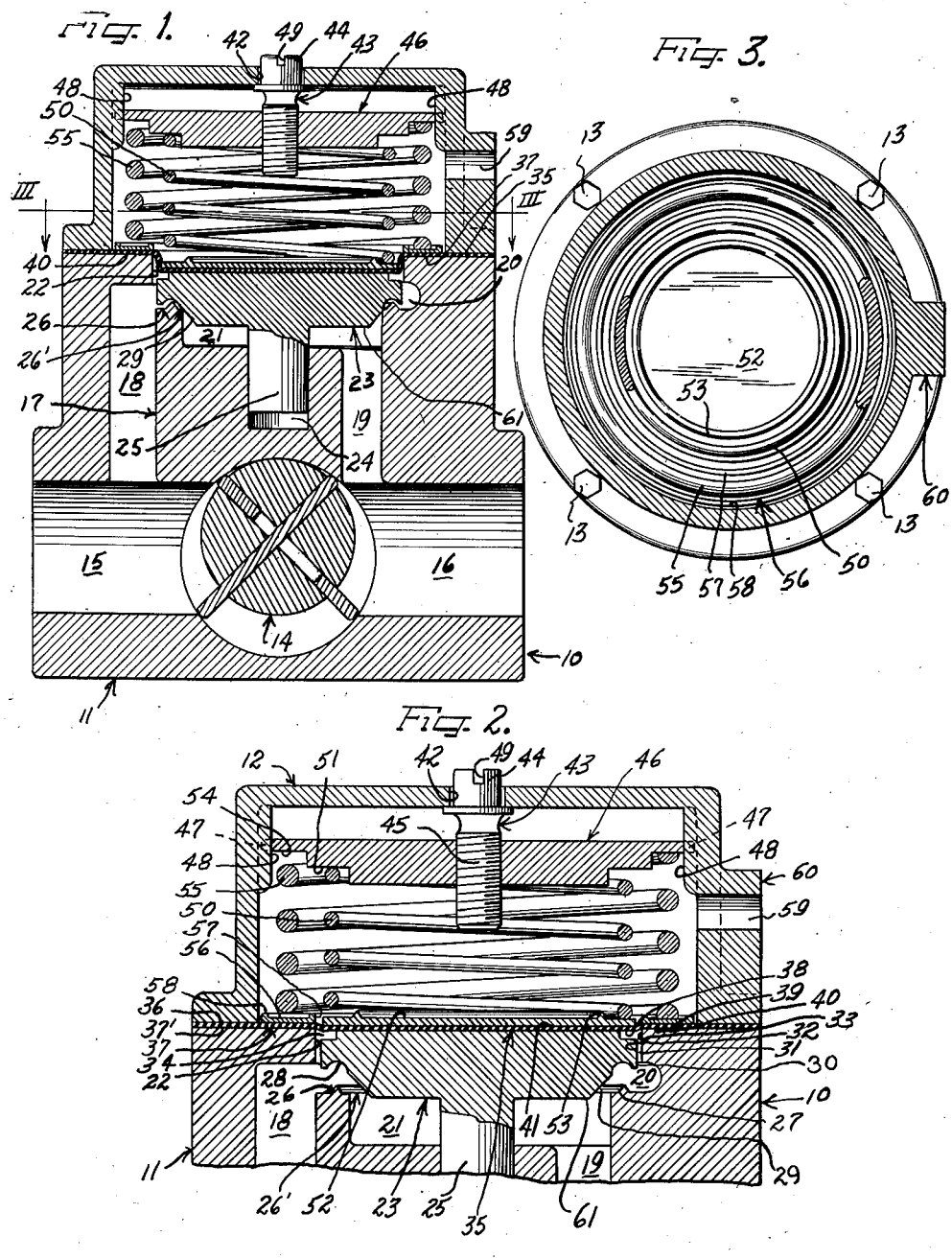

2,586,147

UNITED STATES PATENT OFFICE 2,586,147

REACTION TYPE VALVE

Michele Caserta, Lake Orion, Mich.

Application August 7, 1947, Serial No. 766,965

9 Claims. (Cl. 137—53)

This invention relates to a pressure adjusting device and more particularly to a device for use in a relief valve assembly such as employed in pumps for the transfer of fuel in aircraft.

In many applications involving pumps or fluid pressure regulating devices, and particularly in aircraft fuel systems, it is often desirable that the fluid pressure remain as constant as possible, even if other conditions vary within wide limits. In the particular case of aircraft fuel systems, an engine-driven fuel pump is employed to transfer the gasoline from the reservoir to the carburetor or similar device. The pressure at the outlet of the pump is set originally for a given speed and for a given flow by adjustment of the pressure regulating system or valve.

It is sometimes desirable to apply at the pump inlet the same pressure at which the pump is normally supposed to deliver fuel at the outlet side. This may be done, for instance, at take-off in an airplane, as a precautionary measure, by operation of a booster pump. In such a case it will be appreciated that the outlet pressure will tend to increase. It is well known by those skilled in the art that the amount of increase in pressure will be, generally speaking, dependent upon the size of the valve and the rate of the spring (load necessary to deflect the spring one inch), which acts upon the valve. In particular, the greater the rate of the spring, the greater will be the increase in pump outlet pressure above the original setting, when the inlet pressure is also raised to equal the original setting. Also, the smaller the size of the valve with reference to the size and displacement of the pump, the greater will be the increase in outlet pressure.

By increasing the size of the valve and decreasing the rate of the spring so that movement of the valve will produce large variations in the valve opening and very small variations in the spring load, it is normally possible to keep the variations in pressure at the outlet side within a narrow range. In certain applications, however, and particularly in aircraft, space and weight are at a premium, and unfortunately increases in the size of the valve and decreases in the rate of the spring mean increased size and weight of the whole system. Furthermore, a large valve does not always seat properly and is more easily distorted than a smaller one. Also, a low spring rate may mean a greater tendency of the valve to stick for mechanical reasons, thereby defeating its purpose.

In many of the valve structures used for regulating fluid pressure and particularly in aircraft fuel systems, the outlet fuel pressure varies to an undesirable degree with varying inlet fluid pressure. I have discovered that if a valve is provided with a groove about the valve seating surface, and preferably if the valve seat is provided with a corresponding ridge so that the fluid is subjected to a change of direction parallel to the axial movement of the valve as it overflows, dynamic upward pressure is exerted on the valve which is in addition to the static pressure of the fluid on the effective valve area. As a matter of fact, it is then possible to hold the outlet pressure practically constant if the flow is varied from almost the maximum pump displacement to zero.

However, this constancy of outlet pressure has been achieved only after an additional improvement to the ordinary diaphragm-balanced poppet valve. According to standard practice, it is usually desirable to make the effective diameter of the balancing diaphragm substantially equal to the effective diameter of the valve. In my invention, my diaphragm gives the same performance as the ordinary diaphragm if the pressure of the inlet side is below the original setting pressure or if supercharging pressure is added on the top of the diaphragm. If, however, the inlet pressure is increased, my diaphragm is so designed that its effective diameter and therefore its effective area will also increase. The valve is then no longer balanced and the upward pressure on the diaphragm helps to compress the spring acting on the poppet valve, thereby allowing easier opening of the valve and permitting the overflow of fluid from outlet to inlet without excessive increase in outlet pressure.

According to the present invention the additional effective area of the diaphragm is normally rendered ineffective by a second spring surrounding the spring acting on the valve and holding the additional area of the diaphragm inaccessible to the overflow liquid. The rate of the second spring is preferably so proportioned with reference to the rate of the valve spring and in relation to the pressure exerted by the overflow liquid on the additional effective area that approximately the same action will occur whatever the original pressure setting. The rate of the diaphragm spring could, of course, be so proportioned as to have different actions for different settings.

It is, therefore, an important object of my invention to provide a relief valve for aircraft fuel systems and the like of light compact construction wherein the pressure at the outlet will not vary appreciably with varying inlet pressure, other factors remaining substantially constant.

A further important object of my invention is the provision in a balanced diaphragm-type relief valve of means for maintaining the effective area of the balancing diaphragm substantially equal to the effective diameter of the valve until, as the inlet pressure nears the outlet pressure, the effective diameter of the diaphragm is permitted to increase and thereby permit the overflow of fluid from outlet to inlet without excessive increase in outlet pressure.

Still another object of the invention is to provide a novel valve construction utilizing the reaction pressure exerted by overflow liquid to aid in maintaining substantially constant output pressure with varying input pressure of liquid.

Yet another object of my invention is the provision of readily adjustable means for exerting pressure on a standard poppet by-pass valve and upon an incremental effective area of a diaphragm associated with said valve.

Other and further important objects of this invention will be apparent from the disclosures in the specification and the accompanying drawings.

On the drawings:

Figure 1 is a vertical sectional view of my novel reaction-type valve construction showing the valve in closed position;

Figure 2 is an enlarged fragmentary sectional view of the upper portion of Figure 1, with the valve in partially open position; and Figure 3 is a horizontal sectional view of the valve structure taken substantially along the line III—III of Figure 1.

As shown on the drawings:

The reference numeral 10 indicates generally a fuel transfer mechanism, such as an aircraft fuel pump, with which is associated the relief valve assembly of my invention. Said pump comprises a pump casing 11, and a valve housing cover 12 secured to said pump casing 11 by means of bolts 13. The pump, as here diagrammatically illustrated, is of the rotary vane type and is generally designated by the reference numeral 14. The pump casing 11 is provided with an intake 15 and an outlet 16 for connecting the pump in a fuel line to an engine, or to any other point to which the fuel is to be delivered. Interiorly, the pump casing is divided by a transverse partition 17, on the intake side of which is formed a port 18 and on the outlet side of which is formed a port 19. In flow communication with ports 18 and 19 are upper circular passages 20 and 21, respectively, in the upper portion of the valve casing 11. It will be understood, of course, that the port 19 is the inlet port of the relief valve and port 18 is the outlet port of the valve since flow of liquid through the valve is substantially opposite to that in the pump.

The upper portion of the pump casing 11 is formed with an axially concentric, cylindrical bore 22, which is in flow communication with the upper circular passage 20. The relief valve assembly comprises a cylindrical poppet-type valve member 23 mounted coaxially with respect to the cylindrical bore 22 for movement in said bore and in said passage 20 and having a diameter somewhat less than that of the bore 22. A second coaxial cylindrical bore 24 in the transverse partition 17 receives the snugly fitting cylindrical valve stem 25 for reciprocating sliding therein.

Referring now to Figure 2, the reference numeral 26 indicates generally a valve seat including a valve seat proper 26' adapted to cooperate with the under surface of the valve member 23 to interrupt communication between the valve inlet port 19 and passage 21, and the passage 20 and the valve outlet port 18. The valve seat 26 is formed as an annulus coaxially with respect to the valve member 23 and includes a portion of the upper surface of the transverse partition 17 and a portion of the bottom wall surface defining the upper circular passage 20. In the central portion of the valve seat is a circular ridge or bead 27, the function of which will be described in detail later in this specification. A complementary circular groove or channel 28 is formed in the seating surface of the valve member 23, the function of which will likewise be discussed below.

Radially inwardly and outwardly from the circular groove 28 of the valve member 23 are annular beveled surfaces 29 and 30. The beveled surface 29 slopes radially outwardly and axially upward toward the groove 28 tending to guide overflowing liquid from passage 21 into the groove 28. An annular space 31 is provided between the outer peripheral axially extending surface 32 of the valve member 23 and the inner axially extending bore defining surface 33 of the pump casing 11 and an outer annular recess 34 is formed in the top periphery of the valve member 23. It is to be understood that the stem 25 of the valve member 23 serves to maintain the valve member 23 in axial alignment for cooperation with the valve seat 26.

The cover 12, housing the pressure regulating mechanism of my invention, will now be described. A circular diaphragm 35 is clamped about its periphery between the lower flanged end 36 of the housing cover 12 and the upper wall 37 of the valve housing 11. Diaphragm 35 may suitably be formed of a natural or synthetic rubber composition. The annular recess 34 in the valve member 23 is adapted to leave unsupported an annular portion 38 of the diaphragm. An annular portion 39 of the diaphragm 35 resting on the upper wall 37, but not clamped between the lower flanged end 36 of the cover 13 and an outer annular portion 37' of the upper wall 37 of the valve housing 11, is freely supported by an inner annular portion 40 of the upper wall 37. It is apparent, therefore, that this annular portion 39 of the diaphragm 35, which is supported solely by the inner annular portion 40 of the upper wall 37, is free to move upwardly away from the supporting portion 40. A central portion 41 of the diaphragm 35 overlies the top surface portion of the valve member 23.

The top wall of the cover 12 is provided with a central opening 42. A relief pressure regulating mechanism is housed within said cover 12 and comprises a pressure adjusting stud 43 having an upper end 44 projecting out of the cover 12 through said opening 42 and having a lower portion 45 threaded into an adjusting plate 46. The adjusting plate 46 has a pair of radial slots 47, 47 which engage vertically extending inwardly projecting ribs, 48, 48 on the upper portion of the vertical walls of the cover 12. The projecting ribs 48 thus serve to guide the adjusting plate 46 during reciprocating motion while preventing rotational motion thereof. As the projecting portion 44 of the threaded adjusting member 43 is turned, for instance, by means of a screw driver inserted into the kerf 49 in its upper projecting end 44, the adjusting plate 46 is held against rotation with and is confined to axial movement along the threaded adjusting member 43.

The adjusting plate 46 has a pair of progressively larger diameter annular steps. A spring 50 bears at its upper end against the inner annular step 51 and at its lower end against a circular plate 52 resting on the central portion 41 of the diaphragm 35. The circular plate 52 has a concentric circular ridge 53 serving to position the lowermost coil of the spring 50 on the outer peripheral portion of the plate 52. The outer annular step 54 of the adjusting plate 46 confines the upper end of a relatively heavy coil spring 55 that lies outside of spring 50 and extends downwardly coaxially with the pressure adjustment member 43 to bear against an annular plate 56 resting on the portion 39 of the upper wall 37 of the pump casing 11. The annular plate 56 has inner and outer peripheral beads 57 and 58, respectively, for positioning the spring 55 therebetween.

It will thus be apparent that the amounts of compression of the springs 50 and 55 are simultaneously adjustable by means of the adjusting plate 46 and the pressure adjustment member 43. However, this is not necessary and it will be readily apparent to one skilled in the art that springs 50 and 55 may be provided with means for individual adjustment thereof.

My pressure regulating mechanism may be adapted to receive supercharger pressure by connecting the interior of the cover 12 to the supercharger (not shown), for instance, as by means of a port 59 in boss 60 (Figure 3) formed on the cover 12. The effect of introducing supercharger pressure into the cover 12 will be readily apparent to those skilled in the art and need not be mentioned herein except to say that the supercharger pressure will be useful in increasing the outlet pressure in proportion thereto.

By reason of the above construction of the pressure regulating mechanism, the pressure adjustment member 43 can be so adjusted as to give the desired amount of pressure upon the valve member 23 so that the relief valve will remain closed until that amount of pressure is exceeded. In normal operation, the pump takes fluid in through the intake 15 and discharges it through the outlet 16. The amount of compression impressed upon the spring 50 by the adjustment of the pressure adjusting member 43 determines the pressure at the outlet side of the pump 14. When that pressure is exceeded, fluid at the outlet side of said pump passes from the chamber 19 upwardly into the passage 21 against the underside 61 and the annular beveled surface 30 of the valve member 23, thereby causing said valve member to be lifted from its seat 26. Upward movement of the valve member 23 causes an upward movement of the central diaphragm portion 41 against the compressing force of the spring 50. The unseating of the valve member 23 provides a flow passage for fluid from the delivery side of the pump into the upper circular passage 20, through the port 18, and then to the intake side of the pump. The pressure on the outlet side of the pump 14 is thus relieved until a pressure below that for which the regulating mechanism is set is again reached, whereupon the valve member 23 is caused to seat again under the action of the spring 50, as exerted through the central diaphragm portion 41.

In commonly known valve structures, including, for instance, a valve with a 45° seat, as the flow through the outlet side is less than the displacement of the pump, the excess fluid flows through the valve inlet port 19 and lifts valve member 23 as much as is necessary to permit the overflow of excess fluid to the valve outlet port 18. As the flow through passage 16 is increased the excess fluid which must overflow through port 19 is less, and correspondingly, the lift of valve member 23 is also less, as is the tension of spring 50. Therefore, the pressure of the fluid is also correspondingly less. The reverse occurs when the flow of the outlet side is decreased. It can generally be stated therefore that, in the known valve structures, if the flow is increased the pressure decreases, while if the flow is decreased the pressure increases.

If, as is sometimes desirable, the same pressure as that at which the pump is normally supposed to deliver fuel at the outlet side is applied at the pump inlet, for instance, as at take-off of an airplane as a precautionary measure, it is clear that there would be no flow of fuel from the valve inlet port 19 to the valve outlet port 18 until a pressure differential is again established between the two ports. The excess of fluid pumped toward the outlet will increase the pressure in port 19 opening the valve and increasing the compression of spring 50, until the pressure differential between port 19 and port 18 is sufficient to permit overflow from port 19 to port 18 of all the excess fluid through the increased opening between the valve member 23 and the valve seat 26.

In commonly known valve structures, the greater the rate of spring (load necessary to deflect the spring one inch), the greater will be the increase in outlet pressure at the port 5, above the original setting, when the inlet pressure is also raised to equal the original setting.

By increasing the size of the valve member with reference to the size and displacement of the pump so that a slight movement of the valve member will produce large variations in the valve opening, and by decreasing the rate of the spring acting on the valve member so that movement of the valve member will produce very small variations in spring load, it has heretofore been normally possible to keep the variations in pressure at the outlet side within a very narrow range. In certain applications, however, and particularly in aircraft, space and weight are at a premium, and unfortunately increases in the size of the valve and in the weight of the spring mean increase in the size and weight of the whole system.

Furthermore, a large valve does not always seat properly and is more easily distorted. Also, a high spring rate may mean a greater tendency of the valve to stick for mechanical reasons, thereby defeating its purpose.

I have discovered that if the valve is provided with the groove 28, and preferably if the valve seat is provided with a corresponding ridge 27 so that fluid is subjected to a change of direction parallel to the axial movement of the valve as the fluid overflows from port 19 to port 18, the outlet pressure will vary much less when the flow is varied. As a matter of fact it is then possible to hold the outlet pressure practically constant if the flow is varied from almost the maximum pump displacement to zero. This is explained as follows:

In standard poppet valves it is only the static pressure of the fluid which by acting on the effective area of the valve member balances the spring tension. In my new valve, however, which for simplicity I call a "reaction-type valve," because of the reversal of direction of the fluid flow, an upward pressure is exerted in addition to the static pressure of the fluid on the effective valve area. The greater the mass of fluid which impinges against the groove 28, the greater the pressure so exerted on the valve member 23 tending to move valve member 23 upwardly against the spring compression. Equilibrium is reached when the spring compression equals the static pressure plus the dynamic pressure exerted on the valve member by the fluid.

When, however, the flow decreases, the dynamic pressure exerted by the fluid also decreases while the static pressure is affected very little by the flow. As compared with standard poppet valves we then have a more rapid decrease of the total fluid pressure against the valve, and therefore the reaction type valve will close more than the standard valve would. This, on the other hand, means a greater restriction in the passage between port 19 and port 18 and therefore an increase in the pressure in port 19 as compared to the pressure that would prevail with a standard valve. In other words, the outlet pressure will drop less and the valve member 23 will move more, much in the same manner as if the spring 50 had a lower rate.

Conversely, if the flow through the outlet side is restricted so that the overflow from port 19 to port 18 must increase, owing to the increased mass of the overflowing fluid, the dynamic load on the valve will increase rapidly and the valve member 23 will move more than a poppet valve of standard design would move for a given pressure variation. This also means that the outlet pressure will not increase as much as it would with a standard poppet valve.

The operation of the reaction-type valve when the inlet pressure is being increased up to the original setting of the outlet pressure, while the outlet flow remains constant and the overflow also remains constant is analyzed as follows. The increased opening of the valve to discharge the overflow from port 19 to port 18 under increasingly lower pressure differential must be due only to increase in static pressure. Furthermore, as the velocity of the fluid through the valve at low pressure differential will be low, the reaction will in fact be less than under conditions of original setting when the pressure differential was higher and the velocity was higher.

Therefore, the dynamic feature of the reaction valve so far described would not by itself improve the performance under this analysis.

To correct this situation, I introduce additional improvements to the ordinary diaphragm-balanced poppet valve.

According to standard practice it is usually desirable to make the effective diameter of the balancing diaphragm substantially equal to the effective diameter of the valve. In Figure 2, in order for the diaphragm 35 to have an effective diameter substantially equal to the effective diameter of the valve member 23, the diaphragm must be clamped over the entire top area of the upper wall 37 of the pump housing 11. On the other hand, in order to have an effective diameter larger than that of the valve member 23, while supporting the diaphragm 35 by the entire wall portion 37, I securely clamp it all around only at an outer portion 37' by the bottom flange wall 33 of the cover 12. The annular portion 39 of the diaphragm supported by the wall portion 40 is pressed downwardly by spring 55 under the action of the adjusting plate 46, which is in the present embodiment the same adjusting plate as for the spring 50.

It will be seen that my diaphragm 35 will usually give the same performance as the diaphragm clamped over the entire wall portion 37, if the pressure on the inlet side is reduced below the original setting pressure or if supercharger pressure is applied to the top of the diaphragm. If, however, the inlet pressure is increased, spring 55 is so proportioned that, as the inlet pressure nears the outlet pressure, ring 56 begins to move upwardly, and as a consequence the effective diameter of the diaphragm 35 increases, thereby allowing easier opening of the valve and permitting the overflow of fluid from outlet to inlet without excessive increase in outlet presusre.

The rate of the spring 55 is preferably so proportioned with reference to the rate of spring 50 and in relation to the pressure exerted by the fluid on the portion of the diaphragm 39 supported by wall portion 40 that approximately the same action will occur whatever the original pressure setting.

It could, of course, be so proportioned as to have different actions for different settings and, in fact, a separate adjustment could be provided for spring 55 independently from plate 46.

Returning now to the reaction-type valve, I can say that while, according to my tests, the combination shown seems to give best results, I have noticed that it is not necessary to give both the valve and the valve seat the very definite shape shown in the drawings and that some reaction performance can be obtained, for instance, by leaving the valve with a 45° conical seat and modifying the seat alone; or conversely, by leaving the valve seat flat and providing only the valve with a groove.

The best combination for each application is best determined by experimentation.

I may add that the configuration of the valve member 23, shown in the drawings, seems also to improve the freedom of movement of the valve member and reduce any tendency to stick, thus further effectively improving actual valve performance. This may be due to a floating action of the reversing stream, which tends to keep the valve centrally floated within the seat opening.

It will, of course, be understood that various details of construction may be varied through a wide range without departing from the principles of this invention and it is, therefore, not the purpose to limit the patent granted hereon otherwise than is necessitated by the scope of the appended claims.

I claim as my invention:

1. A diaphragm-balanced relief valve comprising a housing defining an inlet and an outlet passage and a cylindrical relief port in communication with said inlet and outlet passages, a cylindrical poppet-type valve member for movement in said cylindrical relief port to open and close said port, a circular balancing diaphragm exposed to liquid pressure in the outlet passage attached to said valve member and supported on one face so as to have substantially an effective diameter equal to the effective diameter of the cylindrical valve member a clamping ring engaging extreme outer portion of said diaphragm leaving an unclamped intermediate portion, and resilient means acting to maintain the effective diameter substantially equal to that of the valve member, whereby upon substantial increase in liquid pressure in said outlet said resilient means will yield so that the unclamped intermediate portion of the diaphragm is presented to the overflow liquid.

2. A diaphragm-balanced relief valve comprising a housing defining an inlet and an outlet passage and a cylindrical port in communication with said inlet and outlet passages, a valve member adapted for movement in a relief port having a surface adapted to cooperate with a valve seat, said valve seat having a ridge thereon, and said surface of said valve member having a groove complementary to said ridge for utilizing the dynamic reaction of overflowing liquid against said complementary groove to exert a dynamic valve-opening pressure on said valve member, a balancing diaphragm attached to the top of said valve member, housing means clamping the extreme outer portion of the diaphragm and supporting an intermediate diaphragm portion, and resilient means acting on said intermediate diaphragm portion.

3. A relief valve for a cylindrical relief port having a surrounding seating surface generally at right angles to the axis of the cylindrical relief port, inlet and outlet passages in communication with said port, a circular coaxial ridge forming an integral part of said seating surface, a generally cylindrical valve member axially movable in said port for opening and closing said relief port and having an under seating surface, a circular coaxial groove complementary to said circular ridge, a diaphragm having a central circular portion secured to the circular top surface of said valve member, housing means clamping the extreme outer portion of said diaphragm and supporting an intermediate annular diaphragm portion, a first relatively light compression spring acting on the central portion of said diaphragm and through the diaphragm on the valve member, a second compression spring surrounding said first spring and acting on the intermediate supported annular portion of said diaphragm, means for adjusting the compression of said first spring for controlling the inlet pressure of said valve, and means for adjusting the compression of said second spring.

4. A relief valve comprising an open-topped housing defining an inlet and an outlet passage and having a cylindrical port therein, a poppet-type valve having a groove in a flow exposed surface thereof, and annular surface exposed to fluid in said inlet passage and a cylindrical stem, a cylindrical bore coaxial of said port slidably receiving said stem for centering of said valve, a diaphragm extending across the top of said housing and having a central portion secured to said valve and an outer portion supported by said housing, a hollow cover clamping an outer part of said outer portion of said diaphragm leaving the inner part of the outer portion freely supported by said housing, and a selectively adjustable compression spring acting on the inner part of the outer portion of said diaphragm.

5. The relief valve of claim 4 wherein the cover has a passage for receiving a supercharger connection.

6. A relief valve comprising a housing having a cylindrical opening in the top thereof, a coaxial cylindrical valve port therein inlet and outlet passages connecting with said valve port and a coaxial cylindrical bore below said port, a poppet-type valve reciprocating freely in said cylindrical opening and having a stem snugly fitting into said bore for alignment of said valve, a valve seat including a coaxial circular triangular cross-sectional ridge surrounding said valve port, said valve having a complementary V-shaped groove, a diaphragm extending across the top of said housing exposed to said outlet passage and having a central portion engaging the top of the valve and an outer portion supported by said housing, a cover clamping an outer part of said outer portion of said diaphragm against the top of said housing, an inner part of said outer portion of said diaphragm resting on the top of said housing, a first spring in said cover acting on said central portion of said diaphragm, and a second spring in said cover urging said inner part of said outer portion of said diaphragm against said top.

7. A relief valve assembly comprising a housing providing an inlet and an outlet passage and a cylindrical port therebetween in communication therewith and provided with an annular seat, a valve for said seat, a diaphragm clamped at its periphery to said housing and at its central portion to said valve, there being an intermediate annular diaphragm portion supported by said housing but exposed to pressure in the inlet passage when said valve is closed, first resilient means biasing said valve toward closed position and second resilient means biasing said intermediate diaphragm portion into housing-supported relationship, whereby when inlet pressure overbalances the biasing effect of said second resilient means the intermediate annular diaphragm portion is forced out of supporting contact with said housing to increase the effective diameter of said diaphragm and thereby aid in the opening of said valve when the outlet pressure overbalances the biasing force of said first resilient means.

8. A relief valve assembly comprising a housing providing an inlet and outlet passage and a port therebetween in communication therewith and provided with an annular seating ridge, a valve member controlling said port and having an annularly grooved surface for seating against said seating ridge, a diaphragm peripherally clamped to said housing and centrally clamped to said valve member, there being an intermediate annular diaphragm portion supported by but not clamped to said housing and exposed to fluid in the inlet passage when said valve is closed, and first and second springs biasing said valve toward closed position and biasing said intermediate annular diaphragm portion toward housing-supported position, respectively, the overbalancing of the second spring by fluid pressure in said inlet passage aiding the opening of said valve by increasing the effective diaphragm area subject to pressure of the fluid in said outlet passage and said grooved surface aiding in the unseating of said valve by pressure thereagainst of the fluid in said outlet passage.

9. A relief valve for relieving excessive pressure by fluid flow from a high to a low pressure chamber, a valve controlling flow between the high and the low pressure chambers, a first spring biasing said valve to closed position, a diaphragm attached to and movable with said valve and having an unattached portion subject to fluid pressure in said low pressure chamber when said valve is closed and a second spring resisting movement of such unattached portion when subjected to such fluid pressure up to a predetermined value but thereafter yielding to subject a greater area of said diaphragm to such fluid pressure and thus assist in opening said valve.

MICHELE CASERTA.

REFERENCES CITED

The following references are of record in the file of this patent:

UNITED STATES PATENTS

| Number | Name | Date |
|---|---|---|
| 291,013 | Richardson | Dec. 25, 1883 |
| 342,267 | Richardson | May 18, 1886 |
| 1,200,875 | Roy | Oct. 10, 1916 |